United States Patent
Chang

(10) Patent No.: US 7,733,417 B2
(45) Date of Patent: Jun. 8, 2010

(54) MULTIAXIAL EMBEDDED CAMERA MODULE

(75) Inventor: Chin-Fa Chang, Tainan Shien (TW)

(73) Assignee: Quanta Computer Inc., Tao Yuan Shein (TW)

( * ) Notice: Subject to any disclaimer, the term of this patent is extended or adjusted under 35 U.S.C. 154(b) by 1183 days.

(21) Appl. No.: 11/326,386

(22) Filed: Jan. 6, 2006

(65) Prior Publication Data
US 2006/0268157 A1    Nov. 30, 2006

(30) Foreign Application Priority Data
May 26, 2005    (TW) .............................. 94208671 U

(51) Int. Cl.
*H04N 5/225*    (2006.01)
(52) U.S. Cl. ...................................... 348/373; 348/376
(58) Field of Classification Search ................. 348/373, 348/207.1
See application file for complete search history.

(56) References Cited

U.S. PATENT DOCUMENTS

| 5,801,919 | A | * | 9/1998 | Griencewic | 361/683 |
| 5,880,783 | A | * | 3/1999 | Ma | 348/373 |
| 6,417,884 | B1 | * | 7/2002 | Chang et al. | 348/373 |
| 2003/0109232 | A1 | * | 6/2003 | Park et al. | 455/90 |

* cited by examiner

*Primary Examiner*—Lin Ye
*Assistant Examiner*—Temitope Adeyiga
(74) *Attorney, Agent, or Firm*—Rabin & Berdo, PC

(57) ABSTRACT

A multiaxial embedded camera module is described. The embedded camera module includes an exterior container, an interior container, and an image sensing module. The exterior container is embedded in a bezel of an electrical apparatus, e.g. a notebook computer, and is rotatable on the bezel. The interior container disposed the inside of the exterior container is rotatable therein. The rotations of the exterior container and the interior container construct a desired included angle, preferably a right angle. The image sensing module is fixed in the interior container so as to be rotatable on the bezel and the exterior container. The image sensing module further utilizes a flexible printed circuit board directly to connect an image sensing unit for transmitting image signals.

12 Claims, 4 Drawing Sheets

MULTIAXIAL EMBEDDED CAMERA MODULE

RELATED APPLICATIONS

The present application is based on, and claims priority from, Taiwan Application Serial Number 94208671, filed May 26, 2005, the disclosure of which is hereby incorporated by reference herein in its entirety.

FIELD OF THE INVENTION

The present invention generally relates to an embedded camera module. More particularly, the present invention relates to a multiaxial embedded camera module.

BACKGROUND OF THE INVENTION

Because of the fast development of digital image processing technology, digital cameras have become important in consumer electronic products. A digital camera has many advantages. For example, no film is needed in a digital camera, a large amount of image data can be stored in the digital camera, and the captured image can be instantly displayed after taking a picture. A digital camera has image processing functions, such as brightness adjustment and color adjustment. The image data can be stored digitally and be transferred through the Internet. The image data can also be recorded in an optical disk permanently.

Moreover, due to rapid developments in electrical technologies and portable computer applications, notebook computers are gradually becoming smaller and lighter with each passing day. Notebooks have a portable size and weight that enable an enormous increase in productivity, thereby making notebook computers a popular electrical product.

Since notebook computers possess convenient portability and powerful calculation ability, notebook computers have become required equipment for most businessmen. In addition, for conveniently providing multimedia functions and further providing network video conferencing for businessmen, some notebook computers have embedded digital cameras. The digital camera of the conventional notebook computer is normally installed on the bezel of the liquid crystal display for capturing images. However, most of the conventional embedded digital cameras can only provide the user of the notebook computer to talk face-to-face with others in the network. Therefore, the utilization of the digital camera of the notebook computer is limited.

Some notebook computer designers design a digital camera to be able to vertically rotate on the bezel of the notebook computer to extend the utilization and function of the notebook computers with the digital camera. The digital camera can vertically rotate from being aimed toward a user around to the exterior of the computer shell, such that the digital camera can capture images in the direction that the user is looking. However, this is still not sufficient to fulfill the requirements of some professional notebook utilizations. Specifically, when an object is not positioned in front or behind the notebook computer, the conventional embedded digital camera of the notebook computer cannot conveniently capture images of the object without influencing the user's notebook computer operation.

SUMMARY OF THE INVENTION

It is an objective of the present invention to provide an embedded camera module with multiple adjustable axes for capturing images in various directions.

It is another objective of the present invention to provide an embedded camera module embedded in a bezel of a notebook computer with multiple adjustable axes for capturing images in various directions without influencing a user's operation of the notebook computer.

To accomplish the above objectives, the present invention provides a multiaxial embedded camera module. The multiaxial embedded camera module is embedded on a bezel of an electronic equipment, for example, a notebook computer, to capture images in various directions and transmit the captured image signals to the electronic equipment. The multiaxial embedded camera module includes an exterior container, an interior container, and an image sensing module. The exterior container is embedded in the bezel of the electronic equipment and capable of rotating thereon. The interior container is disposed inside the exterior container and capable of rotating in the exterior container. In addition, an exterior rotation direction of the exterior container and an interior rotation of the interior container constitute a predetermined included angle therebetween, preferably a right angle. The image sensing module is disposed inside the interior container and is capable of rotating on the electronic equipment and the exterior container.

The exterior container further includes a first shaft, a second shaft, an exterior container front cover, and an exterior container rear cover. The first shaft and the second shaft are fixed on two sides of the exterior container and are aligned to each other so that the exterior container is capable of rotating on the electronic equipment. The exterior container front cover and the exterior container rear cover form a first chamber to dispose the interior container therein.

The interior container further includes an interior container front cover, an interior container rear cover, and an interior container shaft. The interior container front cover and the interior container rear cover form a second chamber and the image sensing module is disposed inside the second chamber. The interior container shaft is coupled to the first chamber of the exterior container so that the interior container is capable of rotating in the exterior container. The image sensing module further includes an image sensing unit, a flexible printed circuit board, and a connector. The image sensing unit is fixed in the second chamber of the interior container. The flexible printed circuit board for transmitting image signals is directly coupled to the image sensing unit and is extended out of the second chamber and the first chamber. In addition, the flexible printed circuit board utilizes the connector coupled thereon to couple to a corresponding connector of the electronic equipment, for example, a corresponding connector on a motherboard of a notebook computer. The flexible printed circuit board further includes an elastic device disposed on the backside of the connector for stably coupling the connector to the corresponding connector of the electronic equipment. After the multiaxial embedded camera module is embedded in the electronic equipment, a spring piece effectively couples the multiaxial embedded camera module to the electronic equipment. The spring piece has an arc member and a spring foot. The arc member is coupled to the second shaft to provide a predetermined torque when rotating the exterior container, and the spring foot is coupled to the elastic device and pressed on the elastic device for further stably coupling the connector to the corresponding connector of the electronic equipment.

The flexible printed circuit board further includes an N-shaped bend providing a first slack for the flexible printed circuit board as the image sensing unit and the interior container rotates in the exterior container, and a concentric arc bend providing a second slack for the flexible printed circuit board as the exterior container rotates on the electronic equipment.

Hence, the multiaxial embedded camera module according to the present invention can adjustably capture images in various directions without influencing the user who is operating the electronic equipment, especially a notebook computer. In addition, the multiaxial embedded camera module according to the present invention can be disposed at any position of the electronic equipment so that the multiaxial embedded camera module can conveniently capture images from any position of the electronic equipment, thereby effectively extending the utilization thereof.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
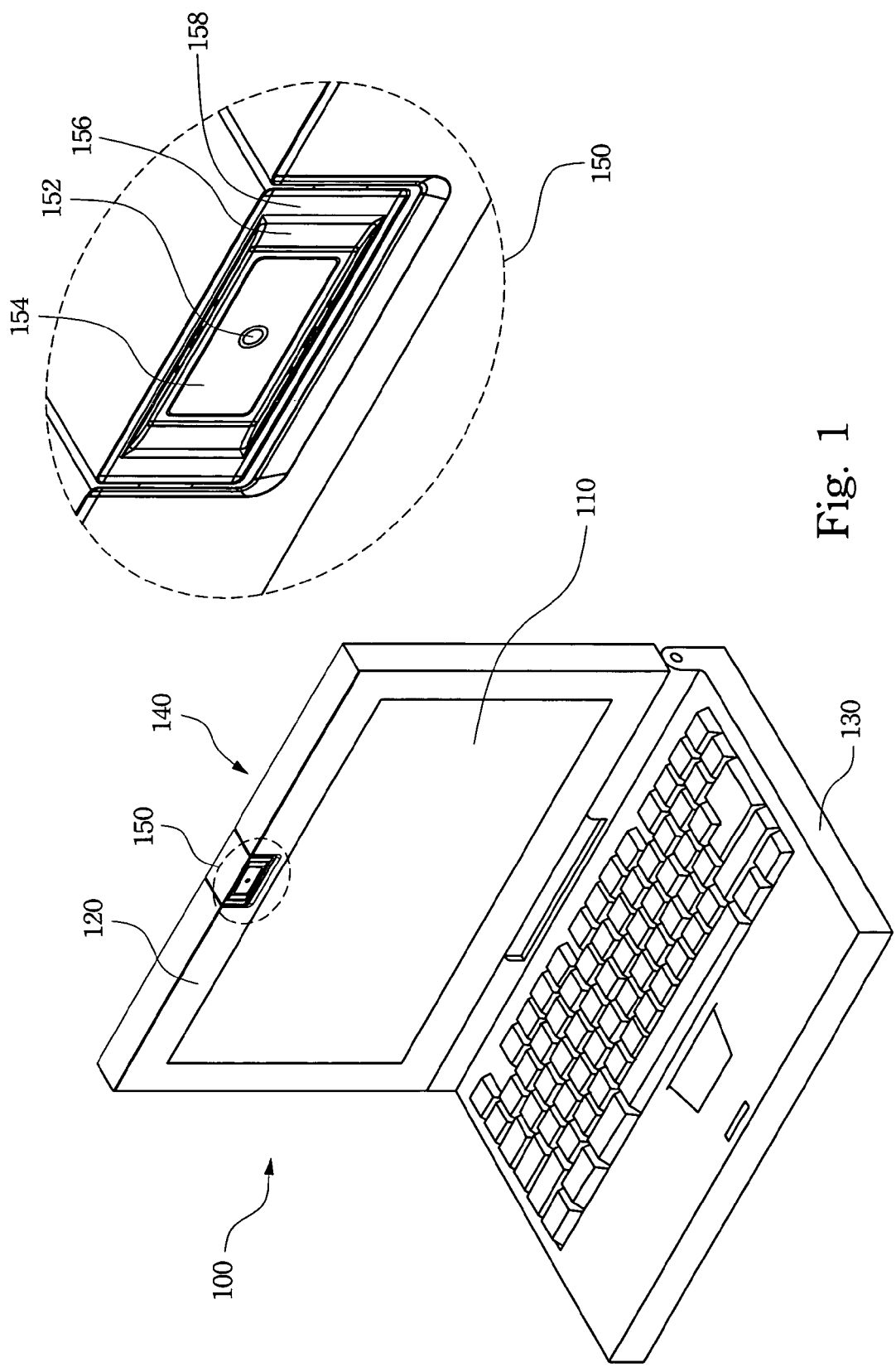
FIG. 1 is a schematic view of a multiaxial embedded camera module according to the present invention installed on a notebook computer.

Referring to FIG. 1, a multiaxial embedded camera module according to the present invention is installed on a notebook computer. In one exemplary embodiment, the notebook computer 100 includes a display panel 110, a bezel 120, and a base 130. The multiaxial embedded camera module 150 is installed on the bezel 120. Because the embedded camera module 150 can be rotated by more than one degree of freedom, the embedded camera module 150 can rotate in the bezel 120 up, down, left and right.

Referring to the enlarged view of the embedded camera module 150 on the right portion of FIG. 1, the embedded camera module 150 further includes an image sensing module 152, an interior container 156, an exterior container 158, and a protection lid 154. The protection lid 154 has an opening in front of the image sensing module 152 to protect the image sensing module 152 and prevent scattered light in the environment from entering the image sensing module 152. The interior container 156 provides one rotational ability, for example, horizontal rotational ability, for the image sensing module 152. The exterior container 158 provides another rotational ability, preferably a rotational ability perpendicular to that of the interior container 156, for the image sensing module 152.

Since the embedded camera module 150 has at least two rotational abilities, the embedded camera module 150 can not only aim at the notebook computer user to proceed a network meeting with the embedded camera module 150 but also aim in front of the notebook computer; that is, rotating the exterior container 158 of the embedded camera module 150 to the front cover shell 140 to capture the images in the same view as the user of the notebook computer. In addition, the embedded camera module 150 can take surrounding images by horizontally rotating the interior container 156 without influence on the user who is operating the notebook computer.

Furthermore, the embedded camera module 150 provides at least two rotational abilities so that the embedded camera module 150 can be disposed at any position, not only to a central position of an upper beam of the bezel 120. The embedded camera module 150 can be installed on any position of the bezel 120 and rotated to aim at the user to proceed the network meeting.

Figure 2:
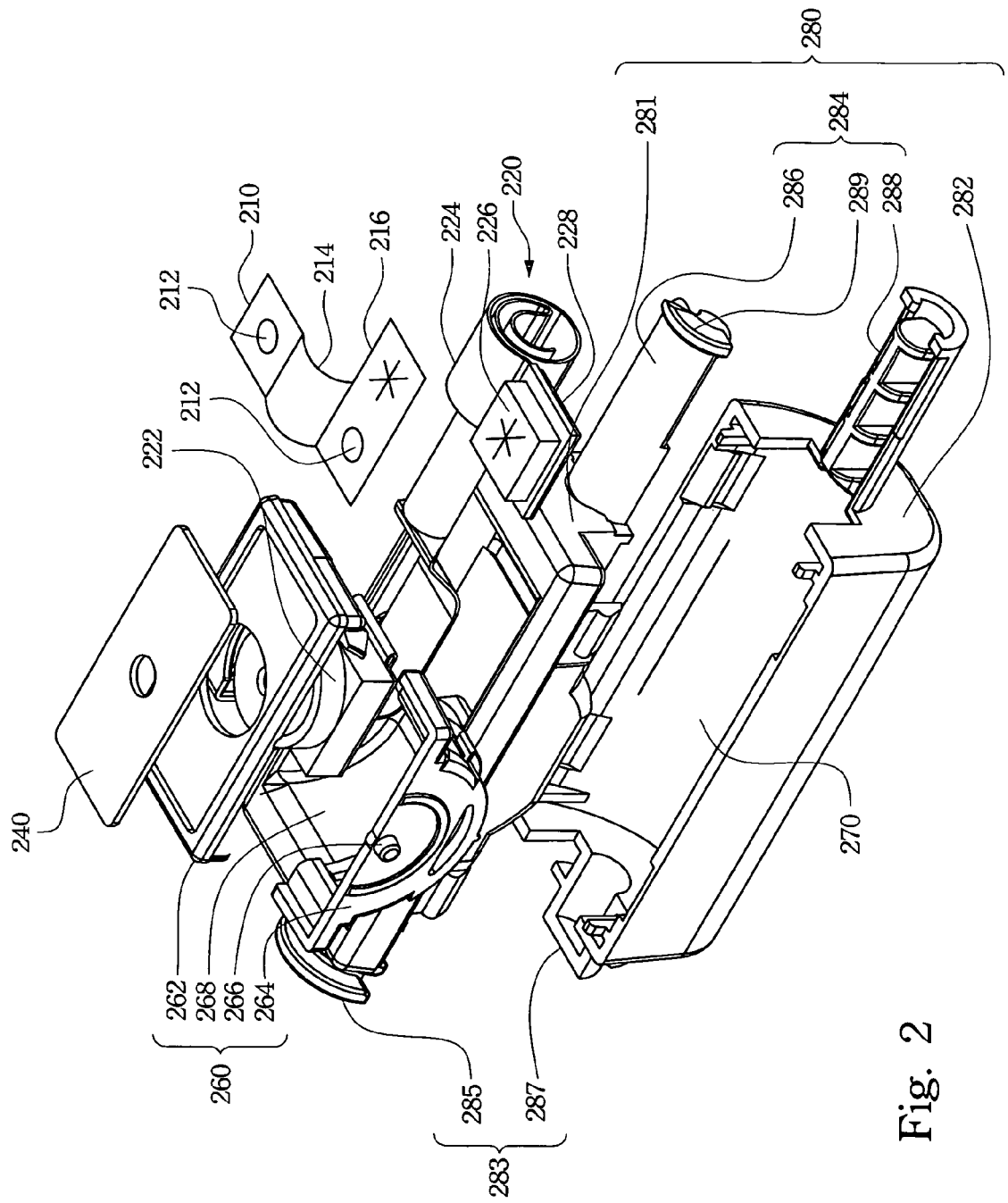
FIG. 2 is an exploded view of the multiaxial embedded camera module according to the present invention.

FIG. 2 illustrates an exploded view of the multiaxial embedded camera module according to the present invention to particularly describe the components of the multiaxial embedded camera module. The embedded camera module includes a protection lid 240, an interior container 260, an exterior container 280, and an image sensing module 220. The interior container 260 further includes an interior container front cover 262, an interior container rear cover 264, and an interior container shaft 266. The exterior container 280 further includes an exterior container front cover 281, an exterior container rear cover 282, a first shaft 283, and a second shaft 284. The image sensing module 220 further includes an image sensing unit 222, a flexible printed circuit board 224, and a connector 228.

The image sensing unit 222 is installed in a second chamber 268, composed of the interior container front cover 262 and the interior container rear cover 264, and transmits the image signals to the motherboard of the notebook computer via the flexible printed circuit board 224 and the connector 228.

The interior container 260 utilizes the interior container shaft 266 to install in a first chamber 270 composed of the exterior container front cover 281 and the exterior container rear cover 282, and therefore the interior container 260 can rotate in the exterior container 280. The exterior container 280 can utilize the first shaft 283 and the second shaft 284 to rotate on the bezel of the notebook computer. The rotational directions of the interior container 260 and the exterior container 280 can constitute various angles, preferably a right angle.

When the multiaxial embedded camera module is capturing images, users only need to rotate the exterior container 280 and the interior container 260 to change the viewing angle and the imaging sensing unit 222 can focus on the object. That is to say, if the user desires to take pictures in front of the user, the user only needs to rotate the exterior container 280 to the front cover shell. While cooperating with the rotation of the interior container 260, the multiaxial embedded camera module can easily take images from various directions. The user only needs to rotate the multiaxial embedded camera module without rotating the body of the notebook computer. Accordingly, taking pictures with the multiaxial embedded camera module has no influence on the computer operation by the user.

When the user desires to proceed a network meeting with others, the user only needs to rotate the multiaxial embedded camera module to aim the image sensing unit 222 at the user's face. In combination with the rotations of the interior container 260 and the exterior container 280, the multiaxial embedded camera module can easily focus on any other object surrounding the user without influence on the notebook computer operation.

Accordingly, the multiaxial embedded camera module according to the present invention can capture images in various directions so that the utilization and function of the notebook computer is effectively extended.

The first shaft 283 further includes a first front cover shaft 285 and a first rear cover shaft 287 respectively disposed on the exterior container front cover 281 and the exterior container rear cover 282. The first front cover shaft 285 and the first rear cover shaft 287 are both partial structures of the first shaft 283 and constitute the complete first shaft 283 when combined together. The second shaft 284 similarly includes a second front cover shaft 286 and a second rear cover shaft 288 respectively disposed on the exterior container front cover 281 and the exterior container rear cover 282. The second front cover shaft 286 and the second rear cover shaft 288 are also partial structures of the second shaft 284. The second front cover shaft 286 and the second rear cover shaft 288 can constitute the complete second shaft 284 when combined together. Alternatively, the complete first shaft 283 and the complete second shaft 284 can be formed on the exterior container front cover 281 or the exterior container rear cover 282 directly.

An end portion of the second shaft 284 further includes a partial flange 289 for coupling to a switch of the notebook computer to indicate a working angle of the image sensing unit 222 for adjusting the direction of the output image.

A spring piece 210 couples the second shaft 284 of the exterior container 280 to the bezel of the notebook computer and is fixed on the notebook computer with the fixing holes 212 and fixing devices, such as screws. In the same manner, the first shaft 283 can also utilize a similar fixing structure to couple to the notebook computer. Alternatively, the first shaft 283 can rotatably couple to the notebook computer within a cavity.

An arc member 214 of the spring piece 210 presses on the second shaft 284 to provide a predetermined torque resistance on the exterior container 280 to avoid an unexpected rotation of the image sensing unit 222, and particularly, while capturing images. The spring piece 210 further includes a spring foot 216 to press on the elastic device 226 of the image sensing module 220 to further stably connect the connector 228 of the image sensing module 220 to a corresponding connector of the notebook computer after the spring piece 210 is fixed on the notebook computer. Therefore, the connector 228 can stably connect to the corresponding connector of the notebook computer so as to prevent the connector 228 from loosening from the corresponding connector due to the movement of the flexible printed circuit board 224 during operations.

Figure 3:
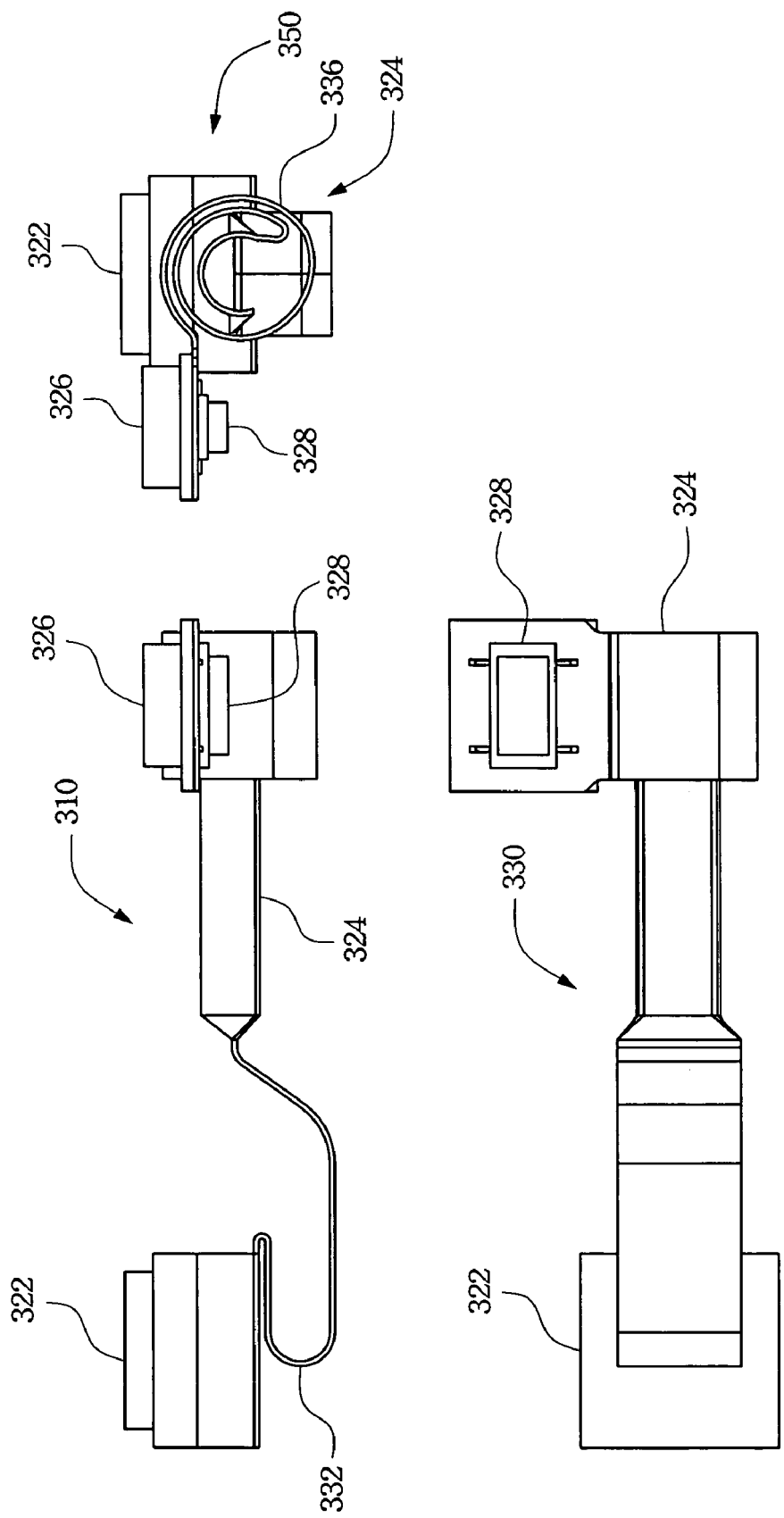
FIG. 3 is a schematic view of an image sensing module of the multiaxial embedded camera module according to the present invention.

FIG. 3 illustrates schematic views of an image sensing module of the multiaxial embedded camera module according to the present invention. On the left upper portion of FIG. 3, a top view 310 thereof is shown. On the left bottom portion, a front view 330 is shown, and a side view 350 is shown on the right portion of FIG. 3. The image sensing module includes an image sensing unit 322, a flexible printed circuit board 324, and a connector 328. The image sensing unit 322 is directly coupled to an N-shaped bend 332 of the flexible printed circuit board 324 and the connector 328 is coupled to a concentric arc bend 336 at another end of the flexible printed circuit board 324. Therefore, the N-shaped bend 332 provides slack for the flexible printed circuit board 324, for example, when the image sensing unit 322 is horizontally rotated. In addition, the concentric arc bend 336 provides another direction of slack for the flexible printed circuit board 324, for example, when the image sensing unit 322 is vertically rotated. The flexible printed circuit board 324 encircles the second shaft 284 (referring to FIG. 2) of the exterior container 280 through the concentric arc bend 336, and the exterior container 280 can rotate along the second shaft 284 with no influence on the image signals transmitted by the flexible printed circuit board 324.

On a backside of the connector 328, an elastic device 326 of the flexible printed circuit board 324 can press on the connector 328 for improving the coupling stability when the connector 328 is coupled to the corresponding connector on a motherboard of a notebook computer. In one embodiment, the elastic device 326 is further pressed by the spring foot 216 of the spring piece 210 (referring to FIG. 2).

Figure 4:
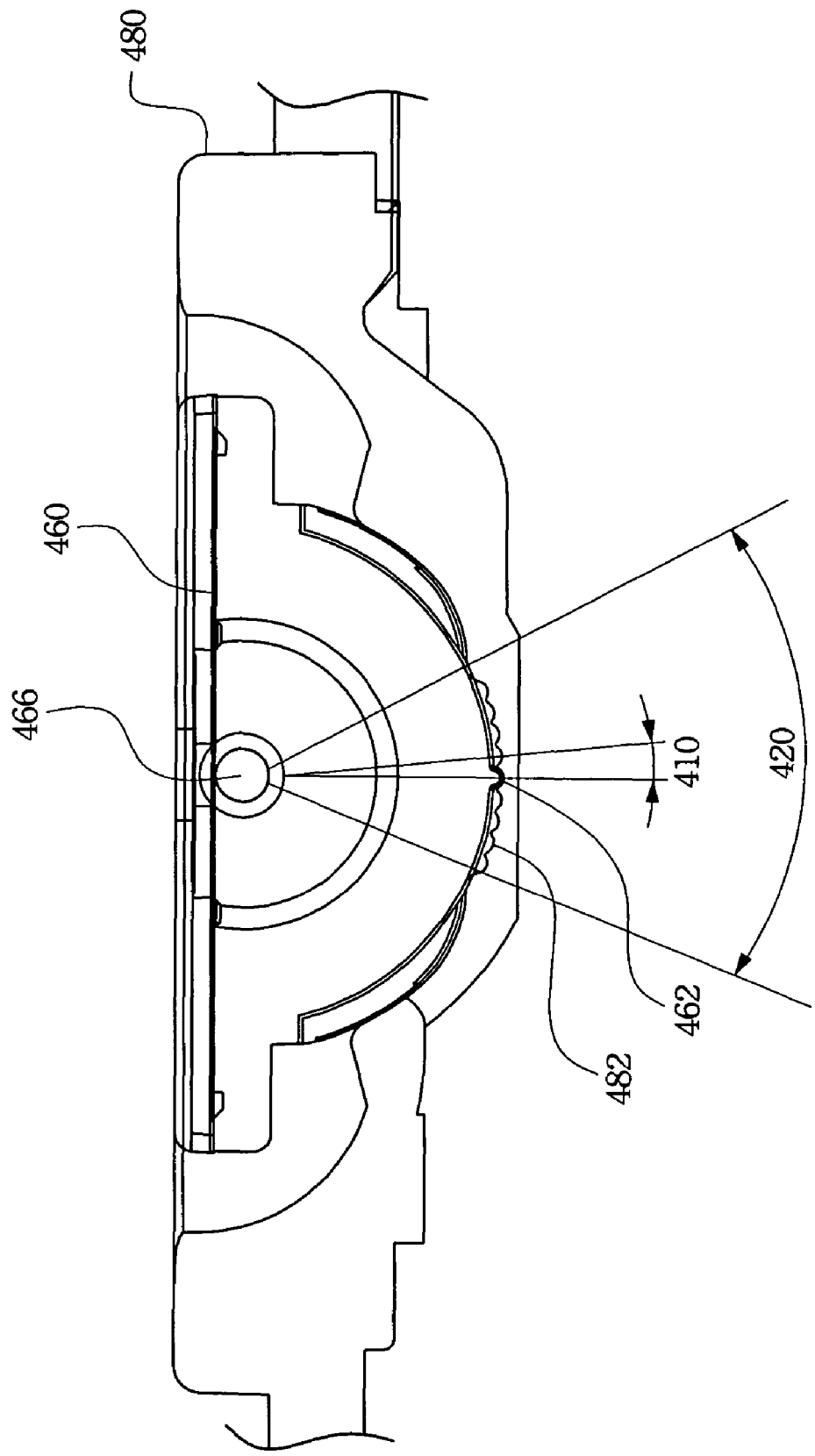
FIG. 4 is a schematic partially enlarged top view of the multiaxial embedded camera module according to the present invention.

FIG. 4 illustrates a schematic partially enlarged top view of the multiaxial embedded camera module according to the present invention. The exterior container 480 further includes exterior container positioning concaves 482 and the interior container 460 further includes an interior container protrusion 462 to couple to the exterior container positioning concaves 482. When the interior container 460 is rotated, the interior container protrusion 462 can move step-by-step on the exterior container positioning concaves 482 and can be fixed in any one therein. Accordingly, the interior container 460 can be fixed on the exterior container 480 at every rotational step 410 within the rotational angle range 420 of the exterior container positioning concaves 482 so that users can conveniently and exactly rotate the image sensing module.

The multiaxial embedded camera module according to the present invention can effectively provide a multidirectional image capturing ability for a notebook computer or any other electronic equipment. The multiaxial embedded camera module can be rotated with no influence on a user operating the electronic equipment. Since the multiaxial embedded camera module can rotate up, down, right and left on the bezel of the notebook computer, the multiaxial embedded camera module can be fixed on any position of the bezel to align to the object by rotating the interior container and the exterior container. In addition, the positioning concaves and protrusions on the interior container and the exterior container can provide effective and convenient operations while positioning and rotating the image sensing unit.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A multiaxial embedded camera module, comprising:
   an exterior container embedded in an electronic equipment and capable of rotating thereon, the exterior container including:
   a first shaft fixed on one side of the exterior container;
   a second shaft fixed on another side of the exterior container and aligning with the first shaft so that the exterior container is capable of rotating on the electronic equipment; and
   an exterior container front cover and an exterior container rear cover both fixed between the first shaft and the second shaft, the exterior container front cover and the exterior container rear cover forming a first chamber;

an interior container disposed inside the first chamber of the exterior container and capable of rotating in the exterior container, an exterior rotation direction of the exterior container and an interior rotation direction of the interior container constituting a predetermined included angle therebetween, the interior container including:
an interior container front cover;
an interior container rear cover coupled to the interior container front cover to form a second chamber; and
an interior container shaft coupled to the first chamber of the exterior container so that the interior container is capable of rotating in the exterior container;
an image sensing module disposed inside the interior container and capable of rotating on the electronic equipment and the exterior container, the image sensing module including:
an image sensing unit fixed in the second chamber of the interior container;
a flexible printed circuit board for transmitting image signals, the flexible printed circuit board directly coupling to the image sensing unit and extending out of the second chamber and the first chamber;
a connector coupling to the flexible printed circuit board and disposed outside the first chamber for coupling to a corresponding connector of the electronic equipment, and transmitting the image signals to the corresponding connector of the electronic equipment;
an elastic device coupling to the flexible printed circuit board and disposed at a back of the connector for stably coupling the connector to the corresponding connector of the electronic equipment to stably transmit the image signals from the connector to the corresponding connector of the electronic equipment; and
a spring piece fixed to the electronic equipment with screws, the spring piece including an arc member and a spring foot, the arc member coupling to the second shaft to provide a predetermined torque when rotating the exterior container and the spring foot coupling to the elastic device and pressing on the elastic device for further stably coupling the connector to the corresponding connector of the electronic equipment to further stably transmit the image signals from the connector to the corresponding connector of the electronic equipment.

2. The multiaxial embedded camera module of claim 1, wherein the electronic equipment is a notebook computer.

3. The multiaxial embedded camera module of claim 1, wherein the flexible printed circuit board further comprises:
an N-shaped bend providing a first slack for the flexible printed circuit board when the image sensing unit and the interior container rotates in the exterior container; and
a concentric arc bend providing a second slack for the flexible printed circuit board when the exterior container rotates on the electronic equipment.

4. A multiaxial embedded camera module embedded in a bezel of a notebook computer, the multiaxial embedded camera module comprising:
an exterior container embedded in the bezel and capable of rotating thereon;
an interior container disposed inside the exterior container and capable of rotating in the exterior container, wherein an exterior rotation direction of the exterior container is perpendicular to an interior rotation direction of the interior container; and an image sensing module disposed inside the interior container and capable of rotating on the bezel and the exterior container; the image sensing module including:
an image sensing unit fixed inside of the interior container;
a flexible printed circuit board for transmitting image signals to a motherboard of the notebook computer, the flexible printed circuit board directly coupling to the image sensing unit and extending out from the interior container and the exterior container;
a connector coupling to the flexible printed circuit board and disposed outside the exterior container for coupling to a corresponding connector on the motherboard of the notebook computer to transmit the image signals to the corresponding connector on the motherboard of the notebook computer; and
a spring piece fixed to the notebook computer with screws, the spring piece including an arc member and a spring foot, the arc member coupling to the exterior container to provide a predetermined torque when rotating the exterior container and the spring foot pressing on a back of the connector for further stably coupling the connector to the corresponding connector of the notebook computer to further stably transmit the image signals from the connector to the corresponding connector on the motherboard of the notebook computer.

5. The multiaxial embedded camera module of claim 4, wherein the flexible printed circuit board further comprises:
an N-shaped bend providing a first slack for the flexible printed circuit board when the image sensing unit and the interior container rotates in the exterior container; and
a concentric arc bend providing a second slack for the flexible printed circuit board when the exterior container rotates on the notebook computer.

6. The multiaxial embedded camera module of claim 4, wherein the exterior container further comprises:
a first shaft fixed on one side of the exterior container;
a second shaft fixed on another side of the exterior container and aligning with the first shaft so that the exterior container is capable of rotating on the notebook computer;
an exterior container front cover fixed between the first shaft and the second shaft; and
an exterior container rear cover fixed between the first shaft and the second shaft, wherein the exterior container front cover and the exterior container rear cover form a first chamber to dispose the interior container therein.

7. The multiaxial embedded camera module of claim 6, wherein the interior container further comprises:
an interior container front cover;
an interior container rear cover coupled to the interior container front cover to form a second chamber and the image sensing module disposed inside the second chamber; and
an interior container shaft coupled to the first chamber of the exterior container so that the interior container is capable of rotating in the exterior container.

8. A notebook computer, comprising:
a display panel;
a bezel surrounding the display panel;
a multiaxial embedded camera module embedded in the bezel, the multiaxial embedded camera module further comprising:
an exterior container embedded in the bezel and capable of vertically rotating on the bezel;

an interior container disposed inside the exterior container and capable of horizontally rotating in the exterior container; and an image sensing module disposed inside the interior container and capable of rotating on the bezel and the exterior container, the image sensing module further comprising:

an image sensing unit fixed inside of the interior container;

a flexible printed circuit board for transmitting image signals to a motherboard of the notebook computer, the flexible printed circuit board directly coupling to the image sensing unit and extending out of the interior container and the exterior container;

a connector coupling to the flexible printed circuit board and disposed outside the exterior container for coupling to a corresponding connector on the motherboard of the notebook computer to transmit the image signals to the corresponding connector on the motherboard of the notebook computer; and a spring piece fixed to the bezel with screws, the spring piece including an arc member and a spring foot, the arc member coupling to the exterior container to provide a predetermined torque when rotating the exterior container and the spring foot pressing on a back of the connector for further stably coupling the connector to the corresponding connector of the notebook computer to further stably transmit the image signals from the connector to the corresponding connector on the motherboard of the notebook computer.

9. The notebook computer of claim 8, wherein the image sensing module further comprises an elastic device coupling to the flexible printed circuit board and disposed at a back of the connector for stably coupling the connector to the corresponding connector.

10. The notebook computer of claim 8, wherein the flexible printed circuit board further comprises:

an N-shaped bend providing a first slack for the flexible printed circuit board when the image sensing unit and the interior container rotates in the exterior container; and a concentric arc bend providing a second slack for the flexible printed circuit board when the exterior container rotates on the notebook computer.

11. The notebook computer of claim 8, wherein the exterior container further comprises:

a first shaft fixed on one side of the exterior container;

a second shaft fixed on another side of the exterior container and aligning with the first shaft so that the exterior container is capable of rotating on the bezel;

an exterior container front cover fixed between the first shaft and the second shaft; and an exterior container rear cover fixed between the first shaft and the second shaft, wherein the exterior container front cover and the exterior container rear cover form a first chamber to dispose the interior container therein.

12. The notebook computer of claim 11, wherein the interior container further comprises:

an interior container front cover;

an interior container rear cover coupled to the interior container front cover to form a second chamber and the image sensing module disposed inside the second chamber; and an interior container shaft coupled to the first chamber of the exterior container so that the interior container is capable of rotating in the exterior container.

* * * * *